United States Patent [19]

Sharpe, Jr. et al.

[11] 4,014,613
[45] Mar. 29, 1977

[54] METHOD AND APPARATUS FOR DETERMINING CHANGES IN SPACING BETWEEN TWO POSITIONS OF INTEREST

[75] Inventors: William N. Sharpe, Jr., Ingham County, Mich.; Glenn W. Hollenberg, Benton County, Wash.

[73] Assignee: The United States of America as represented by the Secretary of the Air Force, Washington, D.C.

[22] Filed: Sept. 10, 1975

[21] Appl. No.: 612,070

[52] U.S. Cl. .............................. 356/106 R; 73/16;
73/88 A; 356/32; 356/111
[51] Int. Cl.² ........................................ G01B 9/02
[58] Field of Search ......... 73/16, 88 A; 356/106 R,
356/107, 109, 110, 113, 32, 111

[56] References Cited

UNITED STATES PATENTS 3,884,581 5/1975 Pryor .................................. 356/109

FOREIGN PATENTS OR APPLICATIONS 1,134,086 11/1968 United Kingdom .................. 73/16

*Primary Examiner*—John K. Corbin
*Assistant Examiner*—Matthew W. Koren
*Attorney, Agent, or Firm*—Joseph E. Rusz; Richard J. Killoren

[57] ABSTRACT

The method of determining the change in the spacing between two positions on a single object or a position on each of two objects, by affixing two linear scatterers at the two positions; illuminating the scatterers with coherent monochromatic light from a source such as a He-Ne laser and obtaining an indication of the relative movement from changes in the interference pattern.

In one apparatus, linear scatterers are positioned on opposite sides of an adhesive in a lap joint. The scatterers are illuminated with light from a He-Ne laser to produce an interference pattern on a screen. Movement of a preselected fringe on the screen will provide an indication of strain in the adhesive lap joint.

In another apparatus, fibers are attached to the ends of a standard bar specimen and a test bar specimen which are placed in a furnace. The fibers are then illuminated with light from a helium neon laser to produce an interference pattern. A slit in a mask is positioned at a predetermined angle with respect to the zero order fringe. A photodetector is placed behind the mask. The output of the photodetector is displayed on a strip chart recorder together with a temperature signal.

3 Claims, 4 Drawing Figures

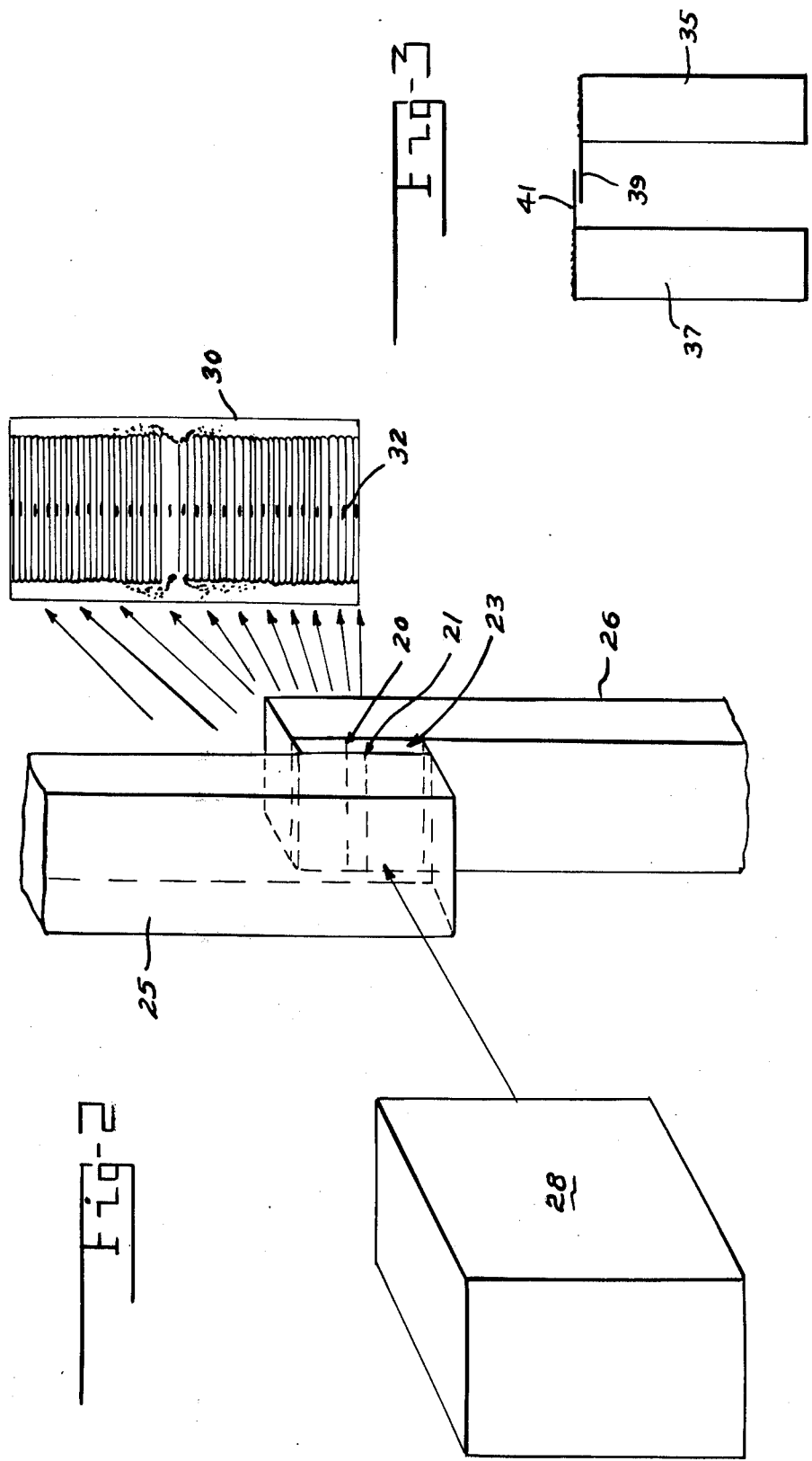

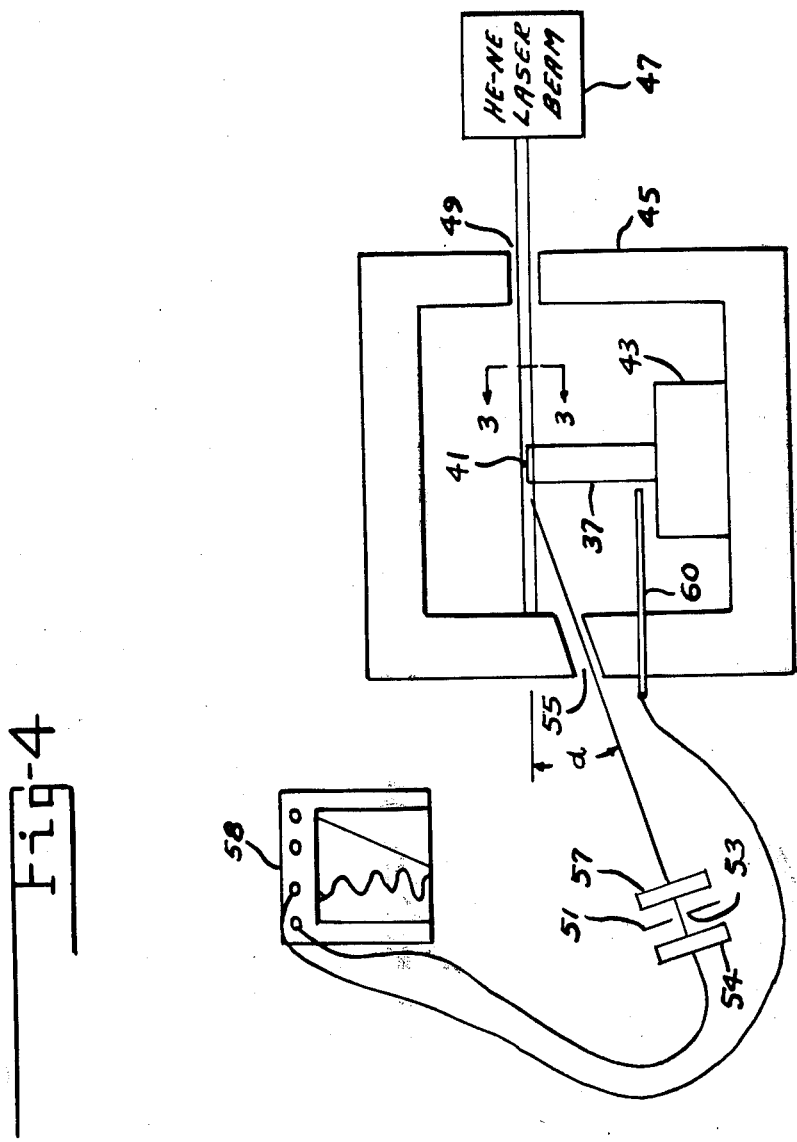

METHOD AND APPARATUS FOR DETERMINING CHANGES IN SPACING BETWEEN TWO POSITIONS OF INTEREST

BACKGROUND OF THE INVENTION

Various means have been used in measuring displacement, such as methods used in determining strains in solids. One such system is described in the patent to Bell, U.S. Pat. No. 2,929,242 wherein a diffraction grating is used to measure strain. The patent to Pryor, U.S. Pat. No. 3,644,739 discloses a system for measuring the displacement of the edges of a slit with the use of a diffraction pattern. It is a well known fact of optics that monochromatic, coherent light passing through two narrow slits separated by a small distance will produce an interference pattern with the spacing of the interference fringes being inversely proportional to the distance between the slits. In the measurement of displacement between positions on objects or relative movement between pairs of objects, it is sometimes difficult to provide slits to produce the interference pattern.

BRIEF SUMMARY OF THE INVENTION

According to this invention, a method is provided for determining the relative displacement between points on an object or the relative movement between pairs of objects. According to this invention, use is made of the fact that monochromatic, coherent light impinging on two narrow scattering strips, separated by a small distance will produce an identical interference pattern to that produced by spaced slits. Two scattering strips, such as wires or fibers, are attached to items for which the displacement is to be measured. A coherent, monochromatic light is then used to illuminate the strips. A measuring device is then provided to give an indication of changes in the fringe locations to provide an indication of displacement.

IN THE DRAWINGS

FIG. 2 is a schematic drawing of one apparatus for providing an indication of relative movement between linear scatterers in an adhesive lap joint.

FIG. 3 shows a standard specimen and test specimen prepared for an expansion measurement.

FIG. 4 is a schematic drawing showing the test apparatus for the specimens of FIG. 3.

Figure 1:
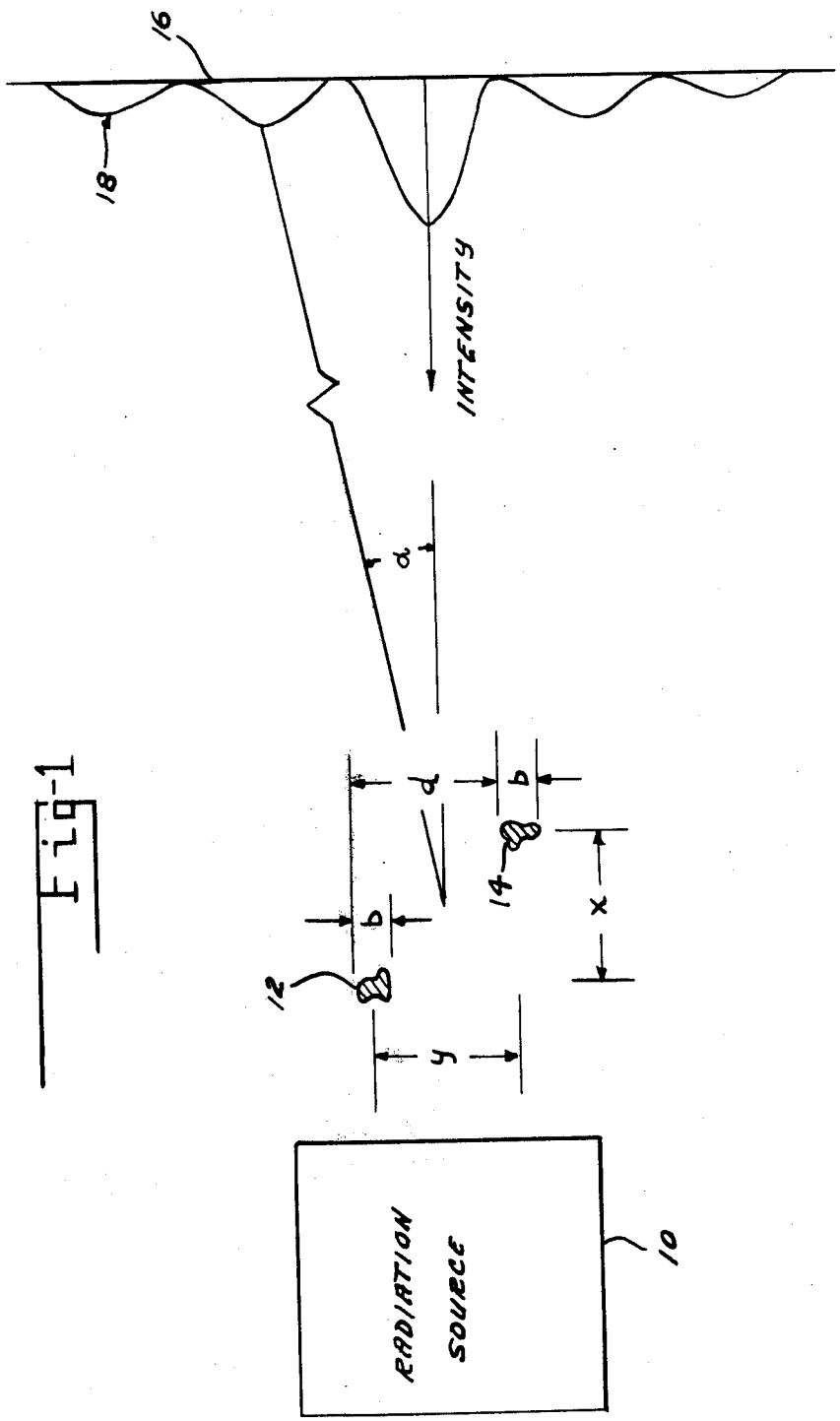
FIG. 1 is a schematic illustration showing a system for determining the relative movement between two scatterers.

Reference is now made to FIG. 1 of the drawing which shows radiation source 10, such as a laser, which illuminates two scatterers 12 and 14 which produce an interference pattern on screen 16 as shown schematically at 18. The scatters may be wires or fibers which are attached to positions of interest such as two parts, on a single item or on separate items, which undergo some relative displacement with respect to each other. One of the parts might be fixed while the other is displaced or both parts could be displaced.

To act as a scattering site, the strips must posses an index of refraction different from the surrounding media, for the wavelength of the radiation used, or must act as if opaque to the radiation. Coherent, monochromatic radiation passing over these strips interferes constructively and destructively to produce the fringe pattern indicated schematically at 18. The position of the intensity peaks is given by expression.

$$x(1-\cos \alpha) + y \sin \alpha = m\lambda$$

where $\alpha$ is the angle measured from the x axis, $\lambda$ is the wavelength of light and $m$ is an integer $0, \pm1, \pm2, \pm3, \ldots$ The integer $m$ is determined by counting fringes from the central zero order fringe. In use, the scatterers can be positioned so that $x$ is equal to zero or small as compared to $y$ so that this equation reduces to:

$$y \sin \alpha = m\lambda$$

The width of the scatter or strips must be small enough to produce diffraction of the incident radiation. Strips between 10 to 100 times the wavelength of the radiation will provide this diffraction pattern. The spacing between the scatterer strips should be greater than the width of the scatterers but must be close enough to produce an interference between the diffraction patterns where the radiation is bright enough to provide usable results. In one device for which an interference pattern was obtained, the radiation wavelength $\lambda$ was equal to 0.6328 microns, the width $b$ of the scatterers was 10 microns and the spacing $d$ was 380 microns.

One system for using the measuring system described above is shown in FIG. 2 wherein two spaced, ½ mil wires 20 and 21 are positioned on opposite sides of an adhesive layer 23 between two transparent strips 25 and 26. The wires are illuminated with radiation from a source, such as a Helium-Neon laser shown schematically at 28. A screen 30 is positioned to display the interference pattern from the wires 20 and 21. Scale markings, such as shown at 32, may be provided on the screen 30. An indication of the shear strain in the adhesive can be determined by finding the change in position of a particular frings in the interference pattern by counting out from the center zero order position. An indication of the shear strain can also be obtained by positioning a photodetector with slit at a predetermined angle $\alpha$, with respect to the zero order beam, and making a recording on a strip chart recorder, of the fringes passing the slit.

Another apparatus wherein the measuring system of the invention can be used to measure the thermal coefficient of expansion of materials, is shown in FIGS. 3 and 4.

A standard specimen 35 and a test specimen 37 have polycrystalline alumina fibers 39 and 41, of about 28 $\mu$m, secured to the upper surface with a bonding agent, as shown in FIG. 3. The standard specimen 35 has a length slightly different than the length of the test specimen 37. Graphite fibers could also be used for the scatterers.

The standard specimen and the test specimen are supported on a support member 43 within a furnace chamber 45, as shown in FIG. 4. Radiation from a Helium-Neon laser 47 is passed through aperture 49 and over fibers 39 and 41, one of which is shown in FIG. 4. A mask 51 has a slit 53 which is positioned at a predetermined angle $\alpha$ with respect to the zero order fringe. A photodetector 54 is positioned behind the slit 53 to receive radiation passing through the slit. Radiation diffracted by the two scatters 39 and 41 pass through aperture 55 in the furnace wall to the mask 51. An interference filter 57 may be provided in front of mask 51, when needed, to remove undesired wavelengths present in the laser beam. The output of the photodetector 54 is supplied to a strip chart recorder 58. A temperature signal from the thermocouple 60 may also be supplied to the strip chart recorder 58.

In the operation of the device of the invention, fibers 39 and 41 are secured to the specimens 35 and 37 respectively. The specimens are then placed on support 43 in furnace chamber 45. Laser radiation is then directed through aperture 49 past the fibers 39 and 41. Radiation diffracted by the fibers pass through aperture 55 to the mask 51. The interference signal from the two diffraction patterns pass through slit 53 to the photodetector 54. As the specimens are heated, the diffraction patterns from the scatterers move over the mask 51. Bright and dark portions of the interference pattern pass over the slit to change the intensity of radiation reaching the photodetector which in turn are recorded on the strip chart. The change in temperature in the furnace is also recorded on the strip chart. The change in spacing between the fibers 39 and 41 for a given change in temperature can be determined from the number of interference fringes which pass the slit 53 and which are recorded on the strip chart. Thus, by knowing the coefficient of thermal expansion of the standard specimen, the coefficient of thermal expansion of the test specimen can be determined.

There is thus provided a method for determining the change in spacing between two positions of interest and appartus for using the method for obtaining data to determine the coefficient of expansion of a test specimen.

We claim:

1. An apparatus for obtaining data for determining the thermal coefficient of expansion of a test block of material having a predetermined length, comprising: a furnace; means for supporting said test block within said furnace; a standard block of material on said supporting means spaced a predetermined distance from said test block; said standard block having a length slightly different than said test block; a linear light scatterer fiber secured to the end of each of said blocks with the diameter of the fibers being less than the spacing between the fibers; means for passing coherent monochromtic light past said fibers to thereby produce an interference pattern; means for providing an indication of charges in said interference pattern in response to changes in temperature in said furnace; means for providing an indication of the temperature within said furnace.

2. The device as recited in claim 1 wherein said means for providing an indication of changes in said interference pattern includes a mask having a slit positioned at a predetermined angle with respect to the zero order frings; a photodetector adjacent said slit; a strip chart recorder connected to said photodetector; said means for providing an indication of temperature within said furnace including a thermocouple within said furnace having its output connected to said strip chart recorder.

3. The method of determining the changes of relative lengths between a test bar of material and a standard bar specimen, having a length slightly different than the length of the test bar specimen, on a support within a furnace; securing a first linear polycrystalline alumina fiber scatterer to the end, of the test bar specimen, remote from said support; securing a second linear polycrystalline alumina fiber scatterer to the end, of the standard bar specimen, remote from said support; directing a beam of coherent monochromatic light past the two linear scatterers; measuring the movement of interference fringes, past a predetermined point, resulting from the changes in spacing between the linear scatterers in response to changes in the temperature within the furnace.

* * * * *